United States Patent
Zoldi et al.

(10) Patent No.: US 8,401,946 B2
(45) Date of Patent: *Mar. 19, 2013

(54) REVENUE ASSURANCE ANALYTICS

(75) Inventors: Scott M. Zoldi, San Diego, CA (US); Steven G. Wu, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,892

(22) Filed: Apr. 2, 2012

(65) Prior Publication Data
US 2012/0191581 A1 Jul. 26, 2012

Related U.S. Application Data

(63) Continuation of application No. 11/857,409, filed on Sep. 18, 2007, now Pat. No. 8,150,744.

(51) Int. Cl.
*G06Q 40/00* (2012.01)
(52) U.S. Cl. ........................................................ 705/35
(58) Field of Classification Search .................... 705/35, 705/30
See application file for complete search history.

(56) References Cited

U.S. PATENT DOCUMENTS

2008/0130850 A1* 6/2008 Bencheqroun et al. .. 379/114.04
2008/0301018 A1* 12/2008 Fine et al. ....................... 705/35

OTHER PUBLICATIONS

Marek, Sue. "Plugging Revenue Leaks." Wireless Week 10.17 (2004): 14-) (1 page).*
Levine, Shira, and Lorien Pratt. "Revenue Assurance Stops the Leak." Telecommunications Americas 39.12 (2005): 28,30,32 (4 pages).*
McCall, Margo. "Turning Off the Revenue Leakage Tap." Wireless Week 8.39 (2002): 15,15,18 (3 pages).*

* cited by examiner

*Primary Examiner* — Elda Milef
(74) *Attorney, Agent, or Firm* — Mintz, Levin, Cohn, Ferris, Glovsky and Popeo, P.C.

(57) ABSTRACT

A system and method of revenue assurance for a service activity are presented. Multiple data feeds are received by a revenue assurance analytic system, where each data feed contains the same logical component of the service activity. The multiple data feeds are processed to detect revenue assurance issues in the service activity based on one or more common linking keys between disparate records related to the logical component.

18 Claims, 5 Drawing Sheets

REVENUE ASSURANCE ANALYTICS

CROSS REFERENCE TO RELATED APPLICATIONS

This application is a continuation and claims the benefit of priority under 35 U.S.C. §120 of U.S. patent application Ser. No. 11/857,409, filed Sep. 18, 2007 now U.S. Pat. No. 8,150,744, entitled "REVENUE ASSURANCE ANALYTICS", which the disclosures of the priority application are incorporated by reference herein.

BACKGROUND

This disclosure relates generally to revenue assurance, and more particularly to analytical techniques for improved revenue assurance.

Revenue assurance is important to many service industries, by requiring reconciliation between records in multiple data feeds to identify discrepancies in records that would lead to revenue leakage or over-billing of a service. In the telecommunications industry, for example, billable telephony records can be reconciled with the base signaling records as the billable telephony records pass through an organization's data collection, guiding, rating, and billing stages before the call appears as a line item on the customer's bill. Common issues include dropped billing records, incorrect start and end times, incorrect rating of the event, or inability to guide the billable record to the appropriate billable account. It has been estimated that as much as seven to fifteen percent of a telecommunications company's service goes unbilled due to revenue assurance issues.

Another example is related to web content delivery (e.g., ringtones, wallpapers, video clips, etc.), where the content is owned by third parties. Mobile companies are billed for their end customer's downloads and must ensure appropriate billing of the end customers. In yet another example, in the utilities industry, upwards of five to ten percent of capacity goes unbilled due to line leakage, un-metered lines, faulty metering equipment, or fraud.

Detection of revenue assurance issues is paramount to an organization, and of importance for the profitability of the organization, yet also for compliance with numerous regulatory or governmental requirements, such as the Sarbanes-Oxley Act (SOX), among others. Unfortunately, current techniques for detecting and resolving revenue assurance issues are inefficient, costly, and of limited effectiveness.

SUMMARY

In general, this document discusses systems and methods for Revenue Assurance Analytics (RAA), for the timely detection of revenue assurance issues for an organization. The disclosed RAA systems and methods process multiple data feeds to detect revenue assurance issues at the record level, in real-time, based on common linking keys between the disparate records, and rank-orders revenue assurance issues in terms of severity utilizing scores and reason codes to indicate likely causes of non-reconciliation. The RAA systems and methods further identify entities in the data that experience severe revenue assurance issues to help analysts investigate and address the main causes of revenue leakage and over-billing.

The RAA systems and methods described herein operate on logical components of activity to determine reconciliation between two data feeds. In one aspect, reconciliation is accomplished through repeated use of two-feed reconciliation components that work on two data feeds containing the same logical component (i.e. a "two-point reconciliation model").

Generally the two-point reconciliation model requires identification of initial and intermediate records. The initial record is the first record generated related to an event. The intermediate record is the second record in a chain of events related to the initial record. In a specific implementation, the initial record could be a switch call detail record and then intermediate record could be a guided record where the raw call detail record has been associated with a billable account. The RAA system and method further use service level and source level profiles. Service level profiles are responsible for detecting non-reconciled records. Source level profiles summarize non-reconciliation occurring at various services that pertain to a given data source.

In one aspect, a computer-implemented method of revenue assurance for a service activity is disclosed. The method includes the step of receiving multiple data feeds, where each data feed contains the same logical component of the service activity. The method further includes the step of processing the multiple data feeds to detect revenue assurance issues in the service activity based on one or more common linking keys between disparate records related to the logical component.

In another aspect, a computer-implemented method of revenue assurance for a service activity includes the steps of processing multiple data feeds related to the service activity, each data feed containing the same logical component of the service activity, and detecting revenue assurance issues in the service activity based on one or more common linking keys between disparate records related to the logical component.

In yet another aspect, a revenue assurance analytic system for a service activity includes a number of two-feed reconciliation components, each adapted for reconciling between two logical data feeds containing respective initial and intermediate records related to the service activity, for generating profiles at the service and source levels of the service activity, and for summarizing reconciliation and non-reconciliation patterns at the service and source levels of the service activities. The system further includes a model that receives the profiles and non-reconciliation patterns from each of the number of two-feed reconciliation components to generate a representation of a severity of each non-reconciliation among the two logical data feeds.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

This document describes RAA systems and methods to detect revenue assurance issues by processing multiple data feeds to detect revenue assurance issues at the record level, in real-time, based on common linking keys between the disparate records. In some implementations, an RAA system employs a scoring mechanism to rank-order revenue assurance issues in terms of severity, and generates reason codes to indicate likely causes of non-reconciliation. The RAA system also identifies the most severe revenue assurance issues to address the main causes of the revenue leakage.

The RAA systems and methods described herein operate on logical components of activity to determine reconciliation between two data feeds. In some implementations, an RAA system repeatedly uses two-feed reconciliation components that work on two data feeds containing the same logical component to determine reconciliation.

Generally, two-point reconciliation is used to identify initial and intermediate records. The initial record is the first record generated related to an event. The intermediate record is the second record in a chain of events related to the initial record. The RAA system and method further use service level and source level profiles. Service level profiles are responsible for detecting non-reconciled records. Source level profiles summarize non-reconciliation occurring at various services that pertain to a given data source.

Two-Feed Reconciliation

Figure 1:
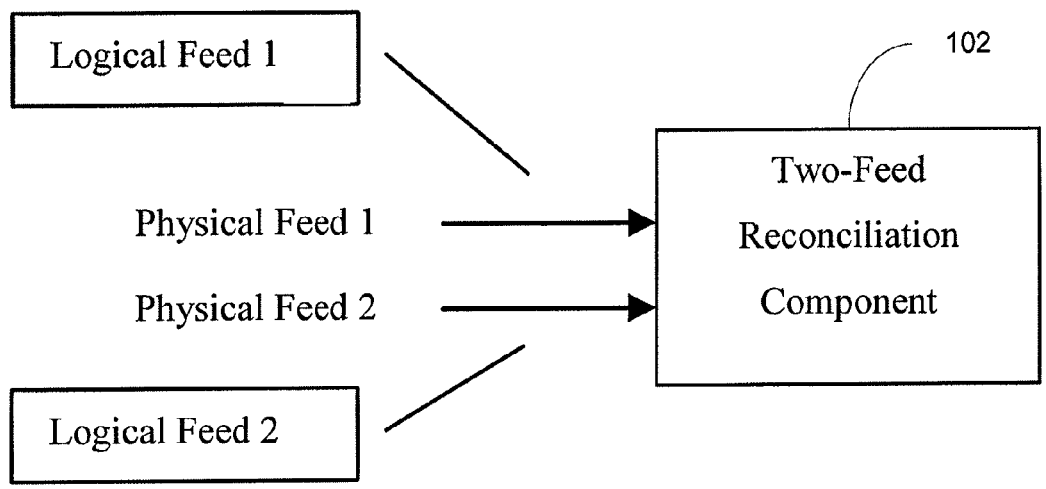
FIG. 1 illustrates two-feed reconciliation that occurs between two physical data feeds in a revenue assurance analytic system.
Figure 2:
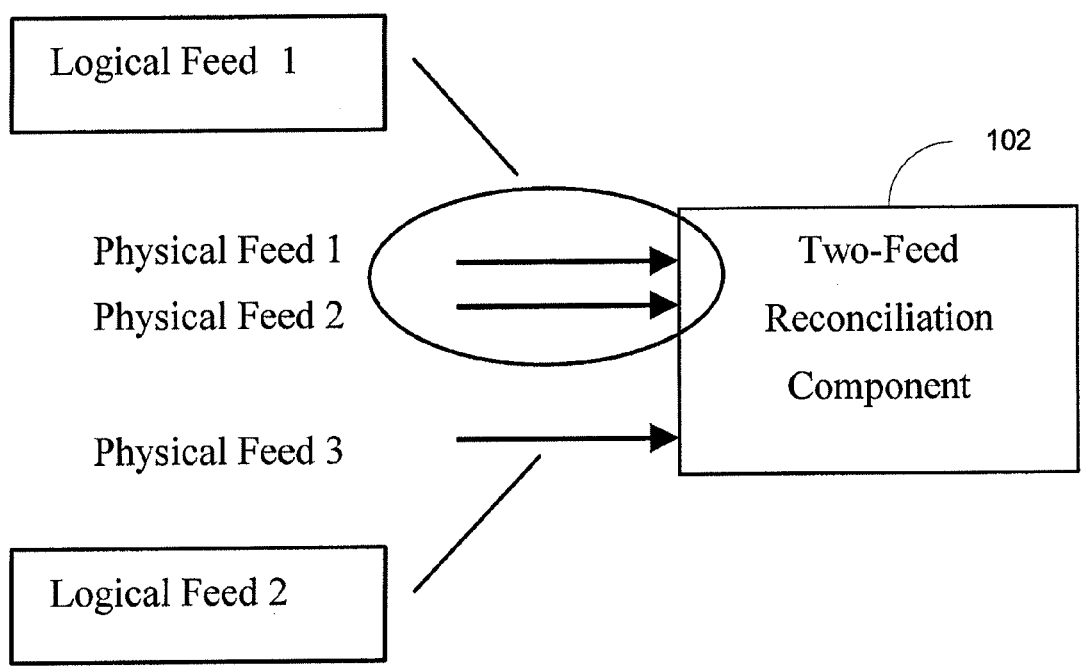
FIG. 2 illustrates one logical data feed that consists of two physical data feeds in a revenue assurance analytic system.
Figure 3:
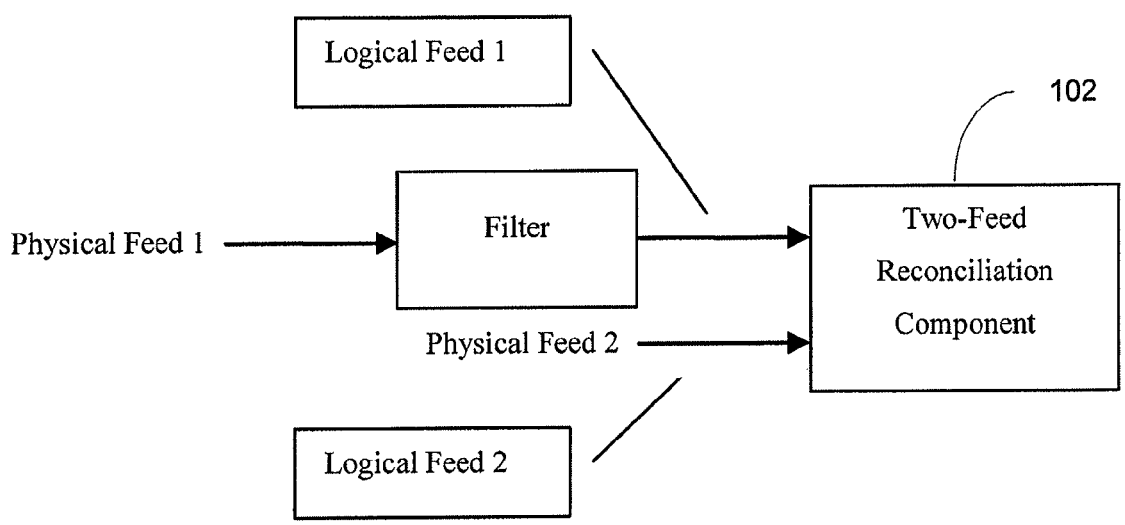
FIG. 3 illustrates a logical feed that is a subcomponent of a physical data feed in a revenue assurance analytic system.

Reconciliation between two logical feeds is a basis for an RAA system and method. FIG. 1 illustrates two-feed reconciliation that occurs between two physical data feeds, which are each equivalent to a logical feed. One logical feed contains the initial records, while the other feed contains the intermediate records. FIG. 2 illustrates a scenario where one of the logical data feeds (in this case, the initial records) consists of two physical data feeds. FIG. 3 illustrates a scenario where a logical feed is a subcomponent of a physical data feed.

FIGS. 1-3 illustrate several basic scenarios, and those having the requisite skill in the art would recognize that other scenarios can exist based on which logical grouping of records are to be considered for the two-feed reconciliation technique.

Revenue Assurance Analytics Architecture

Figure 4:
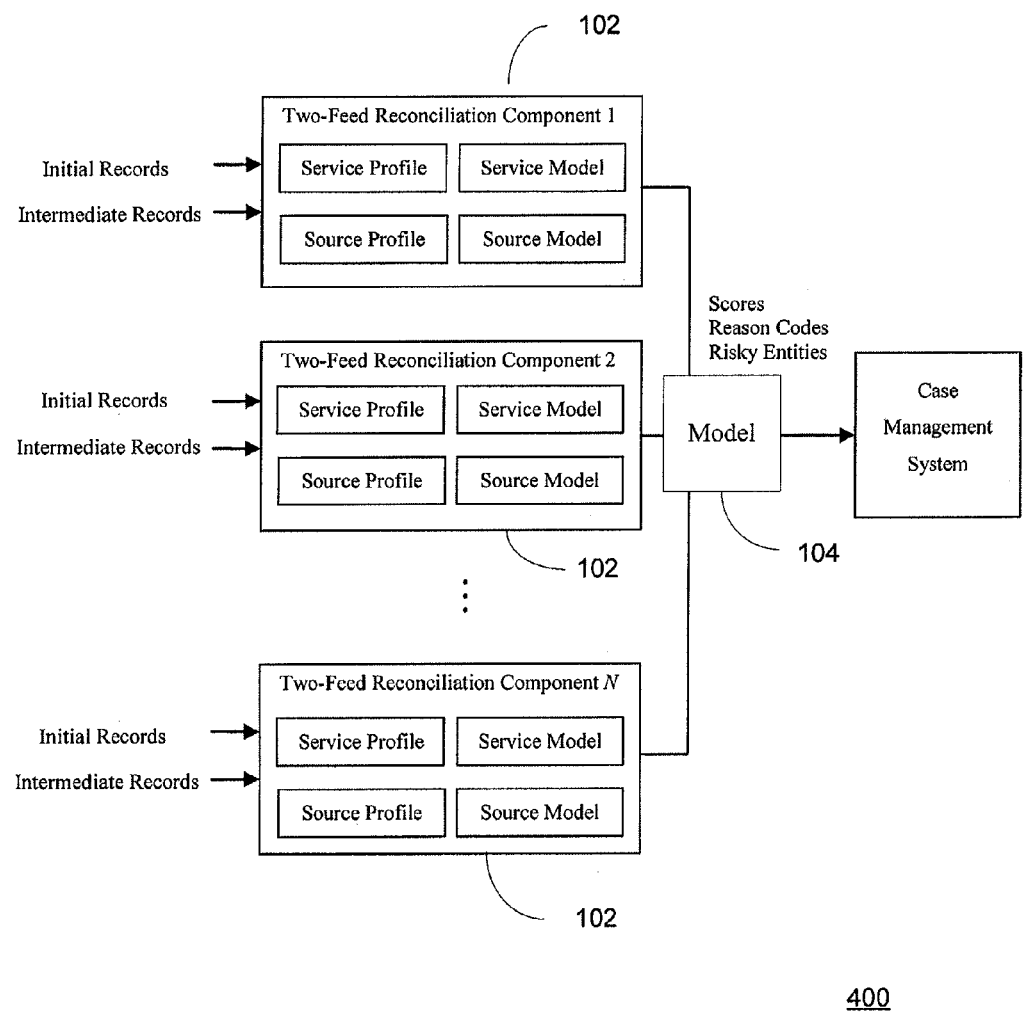
FIG. 4 illustrates a revenue assurance analytics system architecture.

FIG. 4 depicts an RAA system architecture 400, which includes Two-Feed Reconciliation Components 102 (hereafter, "component 102") as shown in FIGS. 1-3. Each component 102 is adapted for reconciling between two logical feeds containing initial and intermediate records, respectively. Each component 102 includes profiles at the service and the source level, which summarize the reconciliation and non-reconciliation patterns at those levels. The profiles include characteristics of the non-reconciliation, and are inputs to a model 104 which combines the inputs to rank order the severity of non-reconciliation.

The model 104 also produces reason codes that provide information on characteristics associated with non-reconciled records. In a telecommunications context, for example, a reason code could indicate the top common attributes of the records as roaming calls, or Premium Rate Service (PRS) calls, or night international calls. Additionally, the model 104 identifies the entities that experience the most severe non-reconciliation. Again, in the telecommunications example, the entities can be a particular switch, country, or content provider, or sets thereof. The entities that are monitored are configurable, to allow for easily actionable outcomes. For example, if a particular switch is responsible for 80% of the non-reconciled records, an organization would want to identify that switch quickly. Likewise, if most of the non-reconciled records are associated with calls to a particular international country, then an organization would want to review the associated logic for that country. Profiles and models are described in further detail below.

Service Profile

The service profile is a unique profile related to a line of the service. For instance, in telecommunications the service profile could correspond to a Calling Line Identity (CLI) of the phone (the phone number, in other words). For utilities, the service profile could relate to a serial number of a utilities meter. The service profile is identified by the service identification information ("service ID"), and is stored in a database, whether in memory or on disk, to be retrieved and dynamically updated whenever a transaction associated with the service is processed by the system. The service profile thus reflects the most up-to-date pattern of the transactions associated with the service. The service profile can be stored back into the database either immediately after updating, or when a transaction with a different service ID arrives to the transaction server.

To facilitate record reconciliation, the service profile serves several functions. The service profile contains a reconciliation table which stores the initial record, and maintains the initial record in the table until it is reconciled or the record is recycled as more recent records are added to the reconciliation table. When the record is marked non-reconciled at the service level, a characterization of the non-reconciliation is required and can be broadly broken into the following categories—"suspected true non-reconciliation" vs. "unknown reconciliation."

Non-reconciliation can arise from limitations of the reconciliation table at the service level where the initial record is removed prior to the arrival of the intermediate record. This situation arises for high-volume transactors, where a finite history at the service level is overwhelmed and records are prematurely recycled. Often, the receipt and time of arrival of initial vs. intermediate records is determined by a specific implementation, and can change over time.

The category "unknown reconciliation" can be determined by volumetric measures. For example, if there is a one hour delay between the arrivals of the initial record and intermediate records, the table size is 20 records deep, and the service has had over 40 transactions in the last hour, then when immediate records do not reconcile it may be due to volumetric issues and can be monitored by running tallies of initial records aged off the table vs. intermediate records that are not reconciled.

Another approach to understand "unknown reconciliation" vs. "suspected true non-reconciliation" is based on the time-span covered by the table, for example if the time span from the oldest transaction to the newest transaction is from 701 AM Tuesday to 932 AM Wednesday. If an intermediate record comes in from 130 pm-134 pm on Tuesday, the corresponding initial record should be on the table, so a field should_be_on_table=1, and the model treats this intermediate record as a "suspected true non-reconciliation." On the other hand, if an intermediate record is from 1230 am-601 am Tuesday, then this record would have already been recycled, so should_be_on_table=0 and the record is considered "unknown reconciliation."

Another parameter that can be used in quantifying "unknown reconciliation" is to measure the time distance from the end of the relevant intermediate record to the "oldest time" represented on the table, in the example above time_distance_to_Table=1 hour. Yet another parameter to addresses the precision at which start-time and end-time is measured across the initial and intermediate records on the table is to measure one or more of the following for a record: 1) Minimum time difference between start-time of intermediate record and all initial records on the reconciliation table; and/or 2) Minimum time difference between the end-time of the intermediate record and all initial records on the reconciliation table. These can allow the RAA system to measure "approximate" reconciliations and systematic errors in the accuracy/precision of the start and end times specified in the intermediate records as compared to the initial records.

When computing the non-reconciliation metrics, the "suspected true non-reconciliation" and "unknown reconciliation" records are assigned different weights. For example, a "suspected true non-reconciliation" counts as 1 record, while an "unknown reconciliation" will count as only $\alpha$, where $\alpha$ is a real number between 0 and 1. The weighting using a reflects the uncertainty in the "unknown reconciliation" records. The weight based on a can either be pre-determined and fixed based on a data study, or dynamically adjusted depending on a combination of factors such as speed of recycling of the table in the profile, time measurement differences mentioned above, or recent overall non-reconciliation metrics.

Once these parameters are computed, a variety of metrics are computed at the service profile level to characterize the non-reconciliation at the service profile level: 1) volume of non-reconciled; 2) ratio of non-reconciled intermediate to total intermediate; 3) and/or ratio of non-reconciled intermediate to total intermediate broken down by properties of the records such as: domestic vs. cross-border transactions, regular vs. premium-rate transactions, weekday vs. weekend, daytime vs. nighttime, channels of transactions (Web vs. phone vs. in-store etc.), content of transactions (voice vs. short messages vs. content download etc.), location of transactions, among others.

The service profile also contains the aforementioned metrics (current and historical) and the aforementioned parameters (current and historical), as well as one or more of the following quantities: 1) time information of the transactions: hour of the day, day of the year, weekday vs. weekend, daytime vs. nighttime, among others; 2) location of the transactions: zip code, city, state, country, whether the transaction occurs in home location, among others; 3) other properties of the transactions: domestic vs. cross-border, voice vs. messages, mobile vs. non-mobile, long vs. short duration, among others; and 4) characteristics of the users: corporate vs. small-and-medium-sized business vs. residential users, frequent vs infrequent users, among others.

Source Profile

The Source Profile is a profile related to the operational systems and source systems that provide the transaction records. For example, for a telecommunications system, a source profile could be TelecomA_SMS, which refers to data that comes from "TelecomA" and the type of data is SMS data. TelecomA_SMS can be considered as a source because the SMS messages are processed differently from voice calls or other provided telecommunication services. Since revenue assurance issues are typically not related to directly to subscriber actions (unlike fraud or bad debt), it is more appropriate to characterize most non-reconciliation and revenue assurance issues at the source data level.

The Source Profile is unique to a data source, identified by the source identification information ("source ID"). The Source Profile is stored in a database, whether in memory or on disk, and is retrieved and dynamically updated whenever a transaction associated with the source is processed by the system and thus reflects the most up-to-date pattern of the transactions associated with the source both at the source level and patterns in aggregate at the services that have transactions in the source data. The Source Profile can be stored back into the database either immediately after updating or when a transaction arrives with a different source ID.

To facilitate record reconciliation, the source profile provides several functions. The source profile contains the current and historical metrics that are aggregated from the corresponding metrics in the service profiles to measure non-reconciliation at the source level. The metrics includes a volume of non-reconciled, a ratio of non-reconciled intermediate to total intermediate, and/or a ratio of non-reconciled intermediate to total intermediate broken down by properties of the record. The properties include: domestic vs. cross-border transactions, regular vs. premium-rate transactions, weekday vs. weekend, daytime vs. nighttime, channels of transactions (Web vs. phone vs. in-store etc.), content of transactions (voice vs. short messages vs. content download etc.), location of transactions, among others.

The source profile includes a variety of "automatic identity detectors." These algorithmic tables rank-order the largest revenue assurance issues across the keys (identities) used to characterize the data. Examples include: SWITCH_ID, COUNTRY_CODE, TIME_OF_DAY, CONTENT_PROVIDER, INTERCONNECT_PARTNER, etc. The "automatic identity detectors" consist of an online-updated frequency rank-ordered table that identifies the largest volume of events (in this case non-reconciliation events) across the unique keys specified. The table is of finite length, and characterizes the highest non-reconciliation volume segments based on the number of keys specified for non-reconciliation.

As an example, if the key is specified to be "country code," the table, if 20 rows deep, would track the 20 highest non-reconciled volume countries to which calls terminate. The algorithm automatically rank-orders and adjusts the ranking of countries in terms of volume of calls on-line and in real time. Then, for each country (the key or identity), the system would track the percentage of non-reconciled intermediate records as a total of all intermediate records for that country (identity).

By reviewing the rate of non-reconciliation across the keys, one can determine whether there is an identity that is experiencing more non-reconciliation than the other high volume keys. For example Country=USA, non-reconciliation=0.01%

Country=Canada, non-reconciliation=0.002%

Country=France, non-reconciliation=0.02%

Country=Mexico, non-reconciliation=0.23%

Country=Brazil, non-reconciliation=0.013% etc.

DEFAULT, non-reconciliation=0.012%

In the example above, by comparing the rates of non-reconciliation in the table, it can be determined, based on the country key, that there is a much higher rate of non-reconciliation for Mexico, such that Mexico should be reported as a suspect reason for reconciliation. As another example, if a key of SWITCH is chosen, Switch=012891, non-reconciliation=0.002%

Switch=0123491, non-reconciliation=0.022%

Switch=32141, non-reconciliation=0.052%

Switch=623891, non-reconciliation=0.003%

Switch=6991, non-reconciliation=0.058%

Switch=1324, non-reconciliation=0.091%

Switch=81238, non-reconciliation=0.01%

Switch=872671, non-reconciliation=0.0088%

Switch=332354, non-reconciliation=5.0%

Switch=91872, non-reconciliation=0.032%

Etc.

DEFAULT, non-reconciliation=0.012%

It can be seen that Switch 332354 has a high-rate of non-reconciliation that could help the telecommunications operator isolate the revenue assurance issue as a switch issue that likely resides in Mexico. Although automatic identity identification is typically configured around volume of non-reconciled calls associated with the key, other instantiations include different weightings for keys based on weighing non-reconciliations for expensive calls such as premium rate, international, high-cost, or risky destination more highly. These "automatic identity detectors" can be defined generically for any key in the transaction, and since it is ranked ordered based on volumetrics and computes the reconciliation rate (note we could also use a fraud rate in fraud applications), then if an identity is detected, it is likely identified as a significant contributor to the revenue assurance issue.

If no significant deviation in the reconciliation rates are found across a key, then no candidate would be identified, as shown in the following example:

Switch=012891, non-reconciliation=0.002%

Switch=0123491, non-reconciliation=0.022%

Switch=32141, non-reconciliation=0.052%

Switch=623891, non-reconciliation=0.003%

Switch=6991, non-reconciliation=0.058%

Switch=1324, non-reconciliation=0.091%

Switch=81238, non-reconciliation=0.01%

Switch=872671, non-reconciliation=0.0088%

Switch=332354, non-reconciliation=0.0281%

Switch=91872, non-reconciliation=0.032%

Etc.

DEFAULT, non-reconciliation=0.012%

In the example above, there is no large deviation, and so no switch identifier would be reported to the telecom operator.

The RAA system and method, employing an automatic identity identification algorithm, utilizes measures of confidence to determine whether the variation is considered significant or within an acceptable range of variation based on a measure of variance and based on the sample associated with the identity. Note, however, that all "automatic identity detectors" have a DEFAULT entry in the table that is at the same time-scale as the individual keys, but which gives a global revenue assurance rate for all records across all keys. This is useful in comparing the individual rates for keys to the global population.

The source profile also can include a variety of "automatic change detectors." These algorithmic tables rank-order the largest revenue assurance issues in terms of certain metrics, across the keys used to characterize the data. Examples include SWITCH_ID, COUNTRY_CODE, TIME_OF_DAY, CONTENT_PROVIDER, INTERCONNECT_PARTNER, etc.

The "automatic change detectors" include an online-updated table that identifies the largest metric changes (in this case initial record volume and non-reconciliation) across the unique keys specified. This table is also of finite length, and therefore characterizes the segments of the largest changes based on keys specified for non-reconciliation.

Returning to the telecommunications example, if the key is specified as "country code," and the table is 20 rows deep, the RAA system would track the 20 countries to which calls terminate and which have the largest changes in initial record volume and non-reconciliation volume. The algorithm automatically rank-orders and adjusts the ranking of countries in terms of the changes (in this case decrease in initial record volume and increase in non-reconciliation volume) on-line and in real time. Then, for each country (the key or identity) the RAA system tracks a change in the volume of initial records for that country (identity). For each country (the key or identity), the RAA system also tracks a change in the percentage of non-reconciled intermediate records as a total of all intermediate records for that country (identity).

By reviewing volume changes across the keys, it can be determined whether there is an identity that is experiencing more record loss than the other keys. For example:

Country=USA, volume change of initial records=1%

Country=Canada, volume change of initial records=−2%

Country=France, volume change of initial records=4%

Country=Mexico, volume change of initial records=−30%

Country=Brazil, volume change of initial records=15%

Etc.

DEFAULT, non-reconciliation=2%

In this example, by comparing the volume change in the table it can be quickly determined that based on the country key, there is a much higher decrease of initial records for Mexico and the RAA system can report Mexico as a suspect reason for reconciliation.

By reviewing the volume changes across the keys, one can determine whether there is an identity that is experiencing more than the usual "accepted" (in many applications there is an accepted level of non-reconciliation) amount of non-reconciliation than the other keys. For example Country=USA, non-reconciliation % change=1%

Country=Canada, non-reconciliation % change=−2%

Country=France, non-reconciliation % change=4%

Country=Mexico, non-reconciliation % change=−3%

Country=Brazil, non-reconciliation % change=15%

Etc.

DEFAULT, non-reconciliation=2%

In the example above, by comparing the percentage change of non-reconciliation in the table, it can be quickly determined that based on the country key there is a much higher increase of non-reconciliation for Brazil, which would be reported as a suspect reason for reconciliation.

The "automatic change detectors" can be defined generically for ANY key in the transaction, and since they are rank-ordered based on volumetric changes, the RAA system can provide a high level of confidence that if an identity is detected, it is a large contributor to a revenue assurance issue. On the other hand, if no significant volume changes are found across a key, then no candidate will be identified. All "automatic change detectors" preferably have a DEFAULT entry in the table that would be at the same time-scale as the individual keys, but give a global revenue assurance rate for all records across all keys, which is used for comparing the individual rates for keys to the global population. Further, the "automatic change detectors" preferably have a suppressor that prevents large percentage changes with small absolute volume as being identified as a top issue.

Service Model

Using the service profile, analytic models are built to detect revenue assurance issues at the service level. The models rank-order the severity of the issues by assigning quantitative values to each transaction. The quantitative values are called "scores" and are computed as functions of the service profile variables. The scores indicate a severity of each revenue assurance issue. For example, the higher the score, the more severe the issue is considered to be. Other relationships can be used. Each model also computes reason codes indicating the leading common attributes of the non-reconciled records. For instance, in the telecommunications example, when most of the non-reconciled records are for roaming calls, then the top reason code will indicate roaming calls.

The model is a mathematical representation of the non-reconciliation patterns and consists of parameters that are developed through historical data. The development of the parameters is called "model training," which can be categorized into two general classes: supervised and unsupervised. When the data contains tags, i.e., fields indicating which records have non-reconciliation issues and which do not, supervised model training is appropriate. Any classification algorithm can be applied, or even some regression methods can be applied as well. When the tags are missing, the approach of unsupervised model training is taken. In some implementations, due to the lack of tags, the model is developed in an unsupervised way.

The model is a weighted linear or non-linear combination of "feature detectors," which in turn are functions of profile variables. The functional mapping from profile variables to feature detectors can be linear or non-linear. Formally, the model can be expressed as:

$$\eta = f(w_i q(x_i)), i=1,\ldots,p, \quad (1)$$

where $\eta$ is the transaction score, determined by a linear or non-linear function $f(\cdot)$ of p transformed feature detectors $q(x_i)$, where the profile variables $(x_1,\ldots,x_p) \in X$. In a simplest form, the function $f(\cdot)$ is as follows:

$$\eta = \sum_{i=1}^{p} w_i q(x_i).$$

The weights $w_i$ are determined through model training based on historical data, and the weights decide the importance of the feature detectors in contributing to the score $\eta$.

A non-linear function to map the profile variables to the feature detectors are as follows:

$$q(x_i) = \min\left\{\max\left\{0, \frac{x_i - q_p}{(q_s - q_r)/c}\right\}, C\right\}.$$

The feature detectors are bounded between 0 and some constant C so that each individual feature only contributes positively to the score, yet at the same time this contribution is limited so it cannot dominate other variables. The parameters $q_p$, $q_s$, $q_r$, and c are design parameters The parameter $q_p$ denotes the value of the p-th percentile for the variable $x_i$, and c is a pre-defined tuning constant to control the effect of the inter-percentile range on the scaled variable. In some implementations, variables can be pre-set such as p=r=95, s=99, c=6, and C=6 identically across all feature detectors.

The weights $w_i$ are determined through model training based on historical data. A variable selection procedure is also employed to determine the optimal set of feature detectors to use in the model. Where no historical data exists weights are assigned to be uniform or to be set based on expert knowledge of the importance of the difference factors.

Source Model

Using the source profile, the RAA system builds analytic models to detect revenue assurance issues at a macro level, i.e., at the data source level. The models rank-order the severity of identified issues by assigning quantitative values to each transaction. The quantitative values are called the "scores" and are computed as functions of the source profile variables. The scores indicate severity of revenue assurance issues. For example, the higher the score, the more severe the issues. Each model also computes one or more reason codes indicating the leading common attributes of the non-reconciled records. For instance, in the telecommunications example, when most of the non-reconciled records are for roaming calls, then the top reason code will indicate roaming calls.

The structure of the model is similar to that of the service model. In some exemplary implementations, the scores are generated by a weighted linear or non-linear combination of "feature detectors," which in turn are nonlinear functions of the variables in the source profile. The "feature detectors" are similar to those at the service level.

The source model also contains the "automatic identity detectors" and the "automatic change detectors." The "automatic identity detectors" and "automatic change detectors" provide actionable feedback associated with the score. Based on this capability the user does not need to run offline reports or perform data audits to mine for the cause of the non-reconciliation. The "automatic identity detectors" and the "automatic change detectors" provide the identities and causes of the revenue leakage to provide timely actions for the user to take to prevent continued revenue leakage. This technique is also critical in many environments whether data sources may change over time based on increased adoption of a service, new markets for a service or through standard configuration and maintenance of the data feed that can cause new and changing revenue leakage issues.

Figure 5:
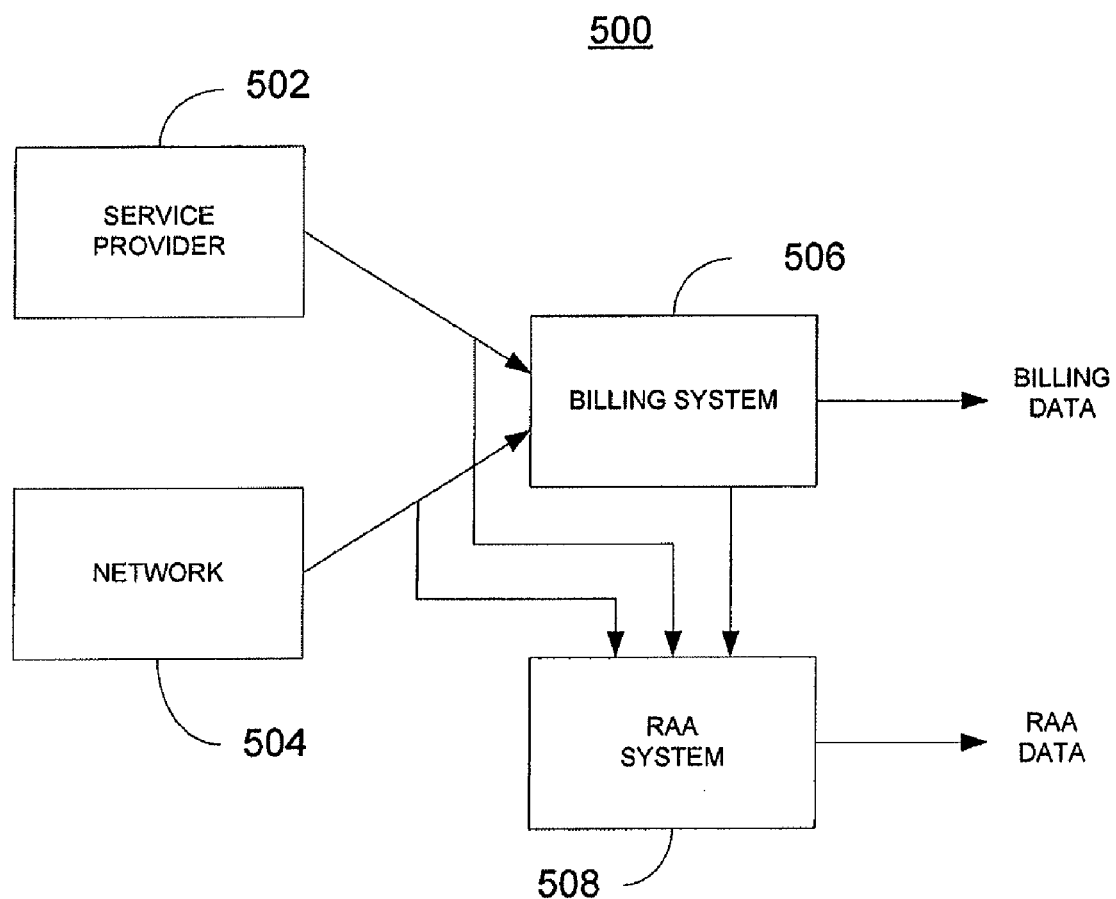
FIG. 5 shows an RAA system in use in a service provider architecture.

FIG. 5 illustrates an RAA system 508 used in a service provider architecture 500, such as an operational telecommunications implementation. A service provider 502, such as a third-party content provider for a telecommunications company, provides a record of services delivered to a requesting customer. A network 504, on which the services are provided, sends network information of network resources used by the customer, i.e. such as the quantity of bandwidth used to deliver content. Both records, in addition to a billable record related to the customer's request for services, are sent to the RAA system 508 as well as a billing system 506 for the service provider. The RAA system 508 executes the processes described above to look for reconciliation issues between the services provided, the resources consumed, and the billable record associated with the services.

Revenue Assurance is an important requirement of many industries and for SOX compliance. The complexity of the business logic and data flows within the business imposes challenges to correctly identify sources of revenue leakage that can be in excess of 5-10% depending on industry. The RAA system and methods described herein addresses this complexity through systematic deployments of two-feed reconciliation modules that point to discrepancies between two related data sources. Analytic models are provided at the service level and data source level to provide a score related to the severity of the revenue assurance issue at each level of granularity. Based on the huge volumes of data and critical dependencies between data sources, the analytics system makes use of "automatic identity detectors" and the "automatic change detectors" which identify key causes related to the revenue assurance issues based on a weighted frequency measure of identities most associated with the revenue leakage. This capability allows for timely and targeted actions to be taken to address revenue assurance issues to prevent further revenue leakage.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method of revenue assurance for a service activity, the method comprising:
   receiving, by a computer, multiple data feeds, each data feed containing a logical component representing a revenue reconciliation of the service activity, each logical component including a model profile summarizing reconciliation patterns at a service level and a source level of the service activity;
   identifying, by the one or more processors, for each logical component of each data feed, an initial record of the logical component and at least one intermediate record of the logical component related to the initial record;
   determining, by the one or more processors from the initial record and at least one intermediate record, a service profile related to the service level of the service activity and a source profile related to the source level of the service activity; and
   processing, by the one or more processors, the service profile and the source profile according to the model profile to detect reconciliation issues in the service activity.

2. The method in accordance with claim 1, wherein the processing is based on one or more common linking keys between disparate records related to the logical components of each data feed.

3. The method in accordance with claim 1, further comprising pairing, by the one or more processors, two of the multiple data feeds for the processing.

4. The method in accordance with claim 3, further comprising generating, by the one or more processors, two-feed reconciliation components from each processed pair of data feeds.

5. The method in accordance with claim 1, wherein the logical component is based on a service of the service activity.

6. The method in accordance with claim 5, wherein the one or more common linking keys include an identifier of a key.

7. The method in accordance with claim 1, further comprising generating, by the one or more processors, a score for each reconciliation issue detected, the score indicative of a severity of an associated reconciliation issue.

8. The method in accordance with claim 7, further comprising generating, by the one or more processors, at least one reason code for each reconciliation issue detected, each reason code indicating a cause for non-reconciliation between the multiple data feeds.

9. The method in accordance with claim 8, further comprising determining, by the one or more processors, a reconciliation between the multiple data feeds based on the at least one reason code and the score.

10. A computer-implemented method of revenue assurance for a service activity, the method comprising:
    identifying, by one or more processors, an initial record of a logical component and at least one intermediate record of the logical component related to the initial record, from multiple data feeds, each data feed containing a logical component representing a revenue reconciliation of the service activity, each logical component including a model profile summarizing reconciliation patterns at a service level and a source level of the service activity;
    determining, by the one or more processors from the initial record and at least one intermediate record, a service profile related to the service level of the service activity and a source profile related to the source level of the service activity; and
    detecting, by one or more processors, revenue assurance issues in the service activity by processing the service profile and the source profile according to the model profile.

11. The method in accordance with claim 10, wherein the processing is based on one or more common linking keys between disparate records related to the logical components of each data feed.

12. The method in accordance with claim 10, further comprising pairing, by the one or more processors, two of the multiple data feeds for the processing.

13. The method in accordance with claim 12, further comprising generating, by the one or more processors, two-feed reconciliation components from each processed pair of data feeds.

14. The method in accordance with claim 10, wherein the logical component is based on a service of the service activity.

15. The method in accordance with claim 14, wherein the one or more common linking keys include an identifier of a key.

16. The method in accordance with claim 10, further comprising generating, by the one or more processors, a score for each reconciliation issue detected, the score indicative of a severity of an associated reconciliation issue.

17. The method in accordance with claim 16, further comprising generating, by the one or more processors, at least one reason code for each reconciliation issue detected, each reason code indicating a cause for non-reconciliation between the multiple data feeds.

18. The method in accordance with claim 17, further comprising determining, by the one or more processors, a reconciliation between the multiple data feeds based on the at least one reason code and the score.

* * * * *